March 20, 1962  A. L. MAYFIELD ET AL  3,026,261
METHOD AND APPARATUS FOR TREATING SEA WATER TO
REMOVE OBJECTIONABLE HARDNESS
Filed Dec. 12, 1957  4 Sheets-Sheet 1
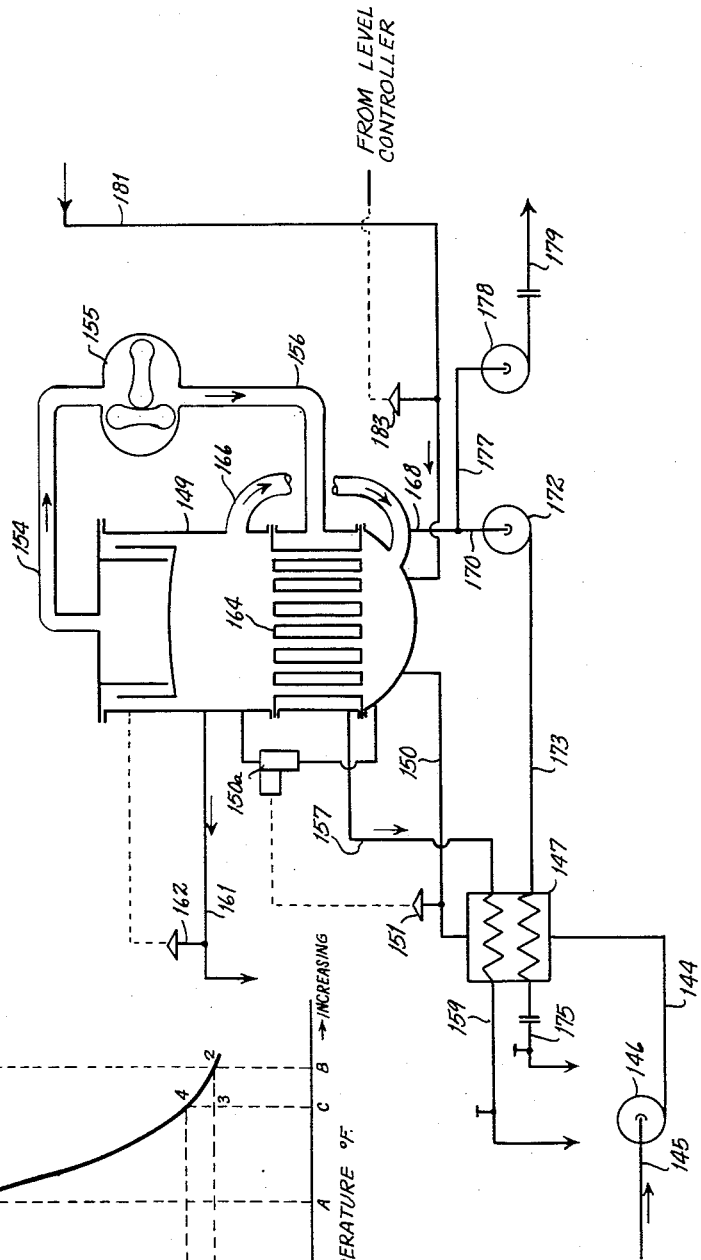
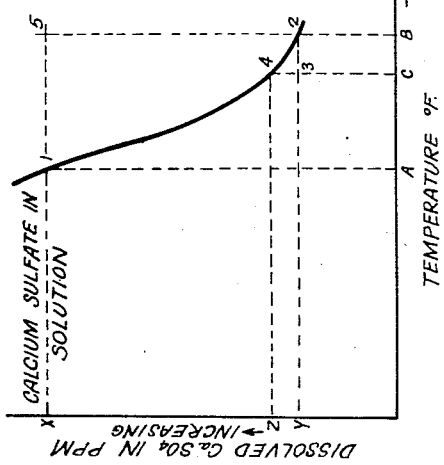
INVENTORS
ALFRED L. MAYFIELD
RAYMOND J. STAFFA
BY
*Kenyon & Kenyon*
ATTORNEYS

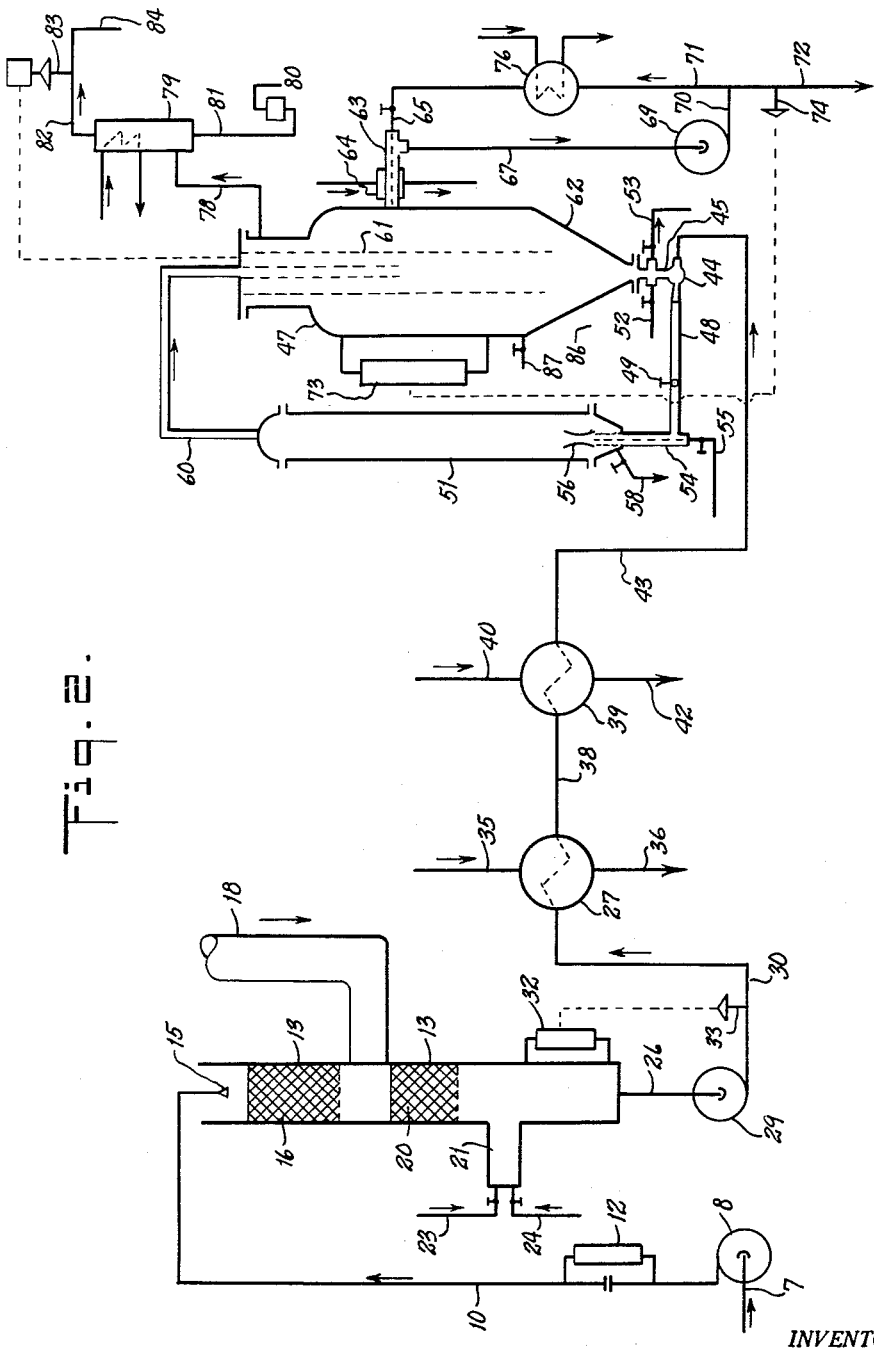

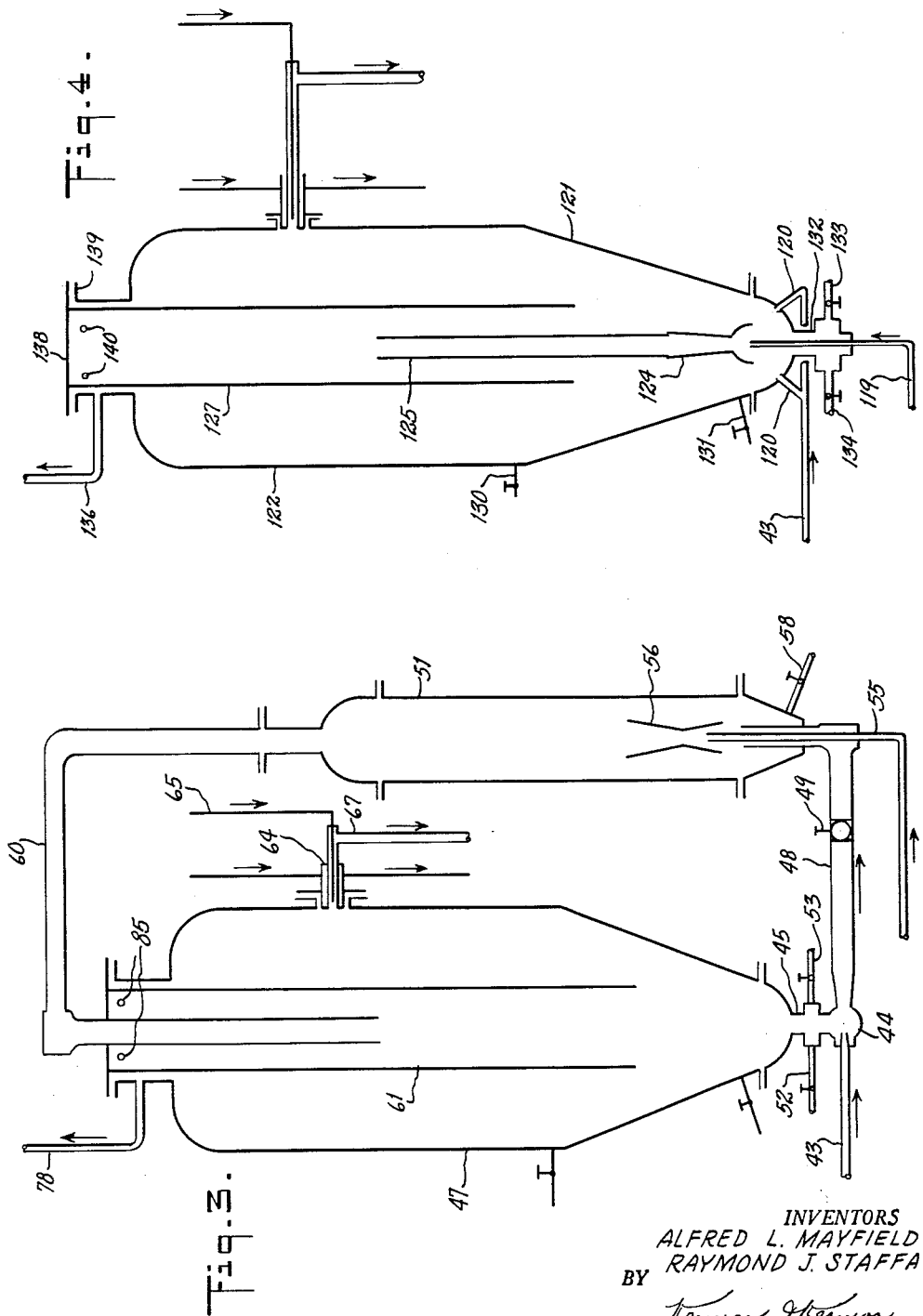

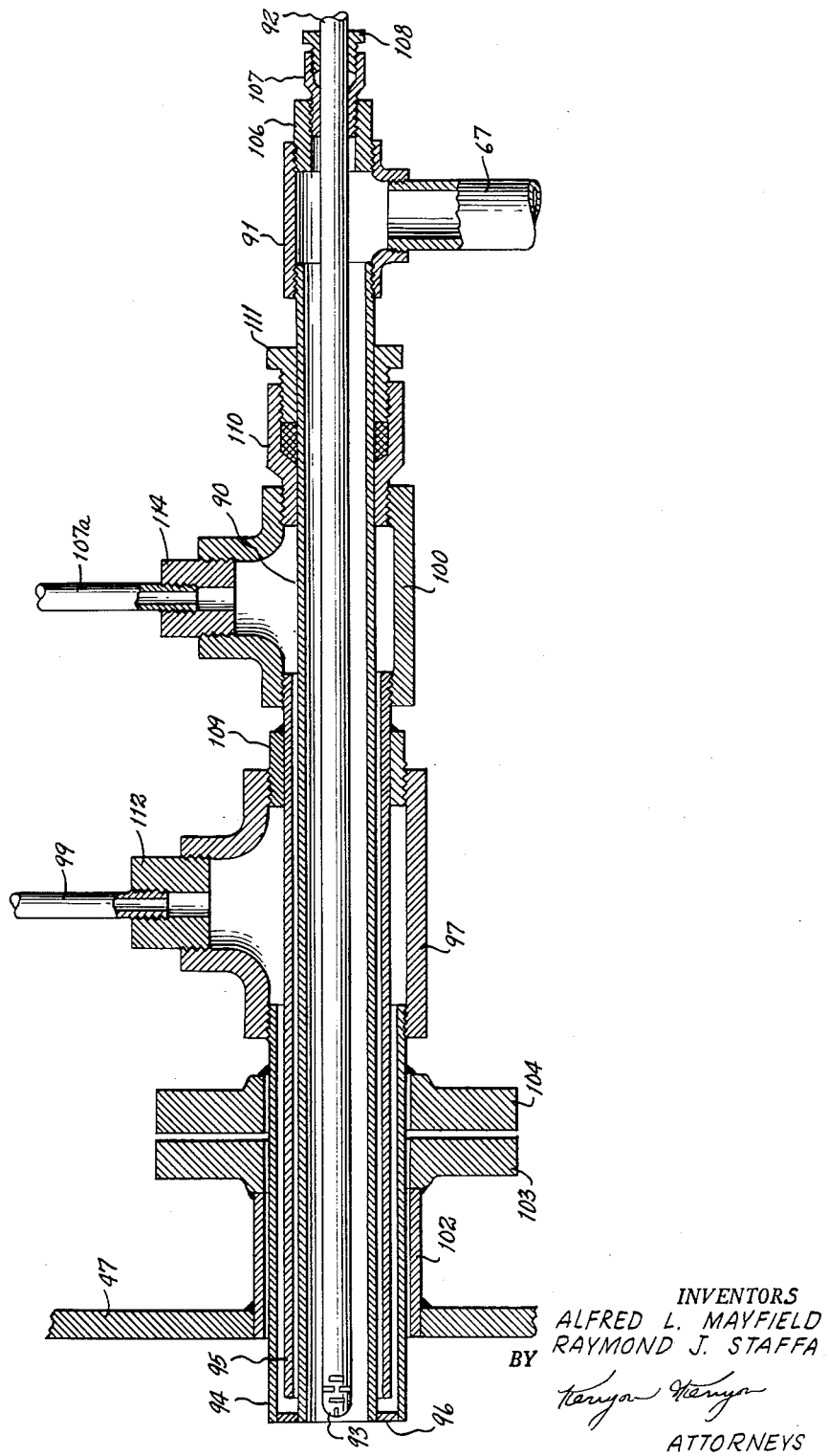

3,026,261
METHOD AND APPARATUS FOR TREATING SEA WATER TO REMOVE OBJECTIONABLE HARDNESS

Alfred L. Mayfield and Raymond J. Staffa, Newgulf, Tex., assignors to Texas Gulf Sulphur Company, New York, N.Y., a corporation of Texas
Filed Dec. 12, 1957, Ser. No. 702,460
16 Claims. (Cl. 210—56)

This invention relates to an improved method and apparatus for eliminating objectionable precipitatable compounds from water and particularly for eliminating such compounds or hardness which are precipitatable by increasing the temperature of the water. It relates particularly to such method and apparatus useful for heating and conditioning waters including sea waters to render them suitable for transmission and use at elevated temperatures without unwanted deposition of scale, particularly on heat transfer surfaces, either required in conditioning and heating the water or in its subsequent use.

Many industrial processes require the use of relatively large volumes of water at elevated temperature and pressure. In many cases a local supply of relatively low hardness water which can be treated economically by chemical process means prior to heating by conventional means is not available—requiring either the transportation of low hardness water great distances or the use of available hard waters such as sea water or contaminated waters containing relatively large quantities of scale-forming salts. For example, in mining sulphur deposits located beneath coastal waters, large volumes of water heated to approximately 330° F. are needed, but the only convenient supply is sea water.

In view of the very high content of scale-forming salts in such hard waters the cost of treating by conventional methods, such as chemical treating, ion exchange, evaporation, etc., is prohibitive, particularly where large quantities are involved. Also, since the scale-forming salts are precipitatable by increase in temperature, the heating of such waters without treatment causes severe scaling of the heat transfer surfaces, process equipment and transmission systems, thus rendering continuous operation difficult. The excessive cleaning costs make such a process uneconomical.

Scales formed upon heating hard waters of the type mentioned above generally include calcium carbonate (calcite), magnesium hydroxide (brucite), and one or more types of calcium sulphate (gypsum, hemihydrate, anhydrite). The type of calcium sulphate scale which predominates is primarily dependent upon the temperature at which the scale is formed.

Carbonate and hydroxyl ions exist only to a limited extent in most natural hard waters. The carbonate ions and the hydroxyl ions which appear in solution and as scale constituents are derivatives of the decomposition of the naturally occurring bicarbonate ions. As the hard water is heated the natural bicarbonate ions decompose into carbonate ions, water and carbon dioxide gas. As a result of this decomposition, some of the carbonate ions combine with calcium ions to form calcium carbonate scale. In addition to the bicarbonate ion decomposing to form the carbonate ion it can also decompose to form the hydroxyl ion and carbon dioxide gas. Either or both carbonate and hydroxyl ions can be formed from the breakdown of the bicarbonate ion upon the application of heat, thereby yielding in the presence of calcium and magnesium ions either or both calcium carbonate and magnesium hydroxide scales. Both calcium carbonate and magnesium hydroxide, therefore, will continue to precipitate or form scale as the temperature of the solution is increased.

The bicarbonate ion is a relatively unstable ion which may decompose upon the application of heat at temperatures well below the normal atmospheric boiling point of water. Hence the calcium and magnesium hydroxide scales can be expected at relatively low temperatures. The hardness in waters which causes scaling or precipitation due to the breakdown of the bicarbonate ion is commonly known as temporary hardness or carbonate hardness.

In addition to heat, other factors which influence the breakdown of the bicarbonate ion are concentrations of the reacting ions, pH of the solution, concentrations of other ions and pressure existing upon the solution.

Calcium sulphate is an inversely soluble compound commonly found in solution in hard waters. The solubility of this compound is not influenced greatly by the pH of the water. The solubility of calcium sulphate is influenced primarily by factors of temperature, concentration of calcium ions and sulphate ions, concentration of other ions and pressure. Increased concentration of other ions increases the solubility of calcium sulphate. The calcium sulphate content of water is commonly known as the permanent hardness.

All of the above salts tend to precipitate with increasing temperature. Broadly speaking, these salts have inverse solubility characteristics, and for the purposes of the present process they may all be termed compounds having inverse solubility characteristics, i.e., their ability to stay in solution or their solubility decreases with increasing temperature due either to chemcial changes or their solubility characteristics. Thus it can be seen that heating waters containing these salts reduces their solubility and frequently results in the precipitation of these salts as a scale.

With the present process and apparatus, in contrast to prior ones, it is possible to remove the objectionable amounts of the above mentioned materials easily and inexpensively without the formation of objectionable scale deposit, either in the apparatus itself or on surfaces which are encountered in the water after treatment and the process is effective for waters ranging in hardness up to concentrated sea water.

It is one object of this invention to provide improved methods and means for treating hard waters for the elimination of the objectionable quantities of precipitatable compounds to make the water suitable and economically usable at elevated temperatures.

Another object of this invention is to provide improved method and means for the elimination of objectionable quantities of precipitatable compounds in water, which are efficient and economical for commercial utilization.

An additional object of this invention is to provide improved method and means for treating hard waters or concentrated solutions for the elimination of the objectionable quantities of precipitatable compounds in the water to prevent scaling of heat transfer surfaces.

Another object of the invention is to provide a method and means in which the elimination of the objectionable material is accomplished by the use of heat, thus eliminating the cost of chemicals and the expenses involved in handling and storing them.

Another object is to provide such a method and apparatus which can be operated substantially free from scale for long operating periods with high heat efficiency, thereby reducing equipment outage and investment in standby equipment and in cleaning costs.

A further object is to provide an improved method for removing objectionable precipitatable compounds from water being treated in evaporating systems.

A further object is to provide an evaporator system in which the objectionable precipitatable compounds are eliminated in such a way as not to interfere with the continuing operation of the evaporating system.

A still further object of this invention is to provide apparatus for the removal of precipitatable compounds for water.

Other objects and advantages of this invention will become apparent from the following description and explanation thereof.

In carrying out this invention, the water to be treated to remove the objectionable compounds and quantities thereof is brought to a condition of labile supersaturation through appropriate heating procedure without objectionable scale formation, and the conditions are controlled so that the solids to be removed are spontaneously precipitated at a selected time or place in such a way that they do not form as a scale in the equipment and are then separated from the water. This is preferably accomplished by mixing the water from which the compounds are to be separated with an aqueous slurry of finely divided solids, and the mixture at a temperature below that of labile supersaturation, is then brought, preferably immediately thereafter, to the temperature at which labile supersaturation occurs by the introduction of a hot gasiform material, preferably steam. This brings about spontaneous or shock precipitation from the aqueous medium of the compound having the inverse solubility characteristic.

The slurry of finely divided solids with which the water is mixed is a slurry preferably made up of the material which is thus precipitated from the water and separated therefrom. In the preferred form of the invention this slurry is added to the water to be treated while it still retains heat from the prior cycle of treatment, so that it helps to bring the water, prior to treatment with the gasiform material, up to a temperature of metastable supersaturation, although heat need not be supplied in this way. In fact, the mixture of water and slurry may be either preheated or not, although preheating introduces economies which are well worth having.

In the preferred form of the process the introduction of the hot gasiform material results predominantly in the spontaneous precipitation of new solid particles and to a lesser extent in the deposition of material on the solid particles forming the slurry. The small particles in the slurry are most effective in the removal of the inversely soluble material by inducing precipitation. However, as these particles increase in size, they become less effective, due undoubtedly to the fact that their surfaces become smoother and because they present less area than the same material would in a more finely divided state. In the preferred form of the invention the removal of the compound from the water is effected by removing the larger of these particles from the slurry, as it is recirculated in the process, thus leaving the more desirable form of finely divided particles for carrying out the process.

In the preferred form of the invention the mixture of the slurry and water containing the dissolved compound at a temperature below that of labile supersaturation, and preferably at a temperature of metastable supersaturation, is fed upwardly into a chamber, where steam is introduced to raise the temperature to that of labile supersaturation to effect the spontaneous precipitation. The flow rate is controlled so as to provide adequate residence time in this chamber for the precipitation to take place and is maintained at such a rate that in general the larger particles of the slurry on which the material has precipitated tend to settle and the bottom of this chamber is so formed to permit removal of a portion of the slurry.

In the preferred form of the invention this removal occurs when a considerable number of particles have attained the less desirable large size and in general the removals are equal to the amount of material removed from the water to be treated.

After spontaneous precipitation, the water admixed with slurry may pass to a second chamber where the water and the slurry are separated by settling and the treated water is drawn off and the slurry may be drawn off for reintroduction into the treating cycle. The water is then cooled to a lower temperature at which it is not saturated.

In the preferred form of the invention the water is preheated to properly conserve heat and reduce the cost of operation, as is customary in many processes. This may be done with an acid material, e.g., flue gases containing carbon dioxide. This introduces sufficient acidity into the water to maintain the bicarbonates and thus prevent precipitation prior to the final treatment. To assure this, the system is maitnained under pressure both to assist in the feeding and to assure the retention of the carbon dioxide. In the case of sea water, the acidic treatment results in water having a preferred pH of not greater than about 6.9, although a pH of not greater than about 6.75 is more satisfactory.

The acid material to be used for lowering the pH of the water and retaining the hardness in solution until the proper time and place for the spontaneous precipitation of the process is any suitable material which will not adversely influence the process of this invention. Many of the well-known organic and inorganic acids can be used for this purpose such as, for example, hydrochloric acid, nitric acid, a sulfonic acid, a fatty acid, carbonic acid, etc. The acid material can comprise an acid anhydride, notably those of the gaseous type, including, for example, carbon dioxide, sulfur oxides, etc. A carbon doxide containing material or a gas containing carbon dioxide, e.g., flue gas, is highly satisfactory. The acid material is added in a quantity sufficient to convert and/or maintain, for example, calcium carbonate and magnesium hydroxide in the form of bicarbonates throughout the temperature and pressure ranges of the water prior to substantial precipitation of the precipitatable compound which crystallizes at a higher temperature. The pH of the water which corresponds to complete conversion of magnesium hydroxide and clacium carbonate to the bicarbonate form is the optimum pH to which the water is lowered. On the basis of economics in some cases, complete treatment with the acid material is not desired. Therefore, some precipitation will occur in the indirect heat exchangers. Depending on the economics, the amount of scaling which can be tolerated will vary for the individual case.

The water feed may be supplied to the process with or without preheat. Normally, however, in practical applications of this process, preheat will be employed as a matter of economy for recovery of substantial quantities of waste heat contained in such sources as boiler flue gases and low pressure exhaust steam which are generally available from the other components of a complete plant. In many cases, part of the preheat will be obtained by direct contact of the water with the boiler flue gases which are passed countercurrent to the water flow in a flue gas heat reclaimer also called an economizer. This procedure is common practice in the sulphur industry. This practice also results in the effects of partially deoxygenating the water and adding carbon dioxide gas which lowers the pH of the water. From the standpoint of economy, in locations where only very hard water, such as sea water, is available, indirect heat exchangers are desirable because they permit recovery of the condensate from the steam used in heating. This condensate is reused as feed water for the production of steam, thus reducing costly water treatment requisite to steam generation. Therefore, for the purpose of the discussion of this case, it is assumed that the waste heat sources are used to their maximum practical extent, i.e., the water will be preheated by the above means to a temperature at which the water becomes supersaturated with respect to one or more of the soluble compounds and fouling of heating surfaces is imminent; this is the metastable region.

The water feed, with or without preheat or acid treatment, is combined with an aqueous slurry of finely divided solid particles. About 0.2 to about 2.0 parts by volume of slurry are combined with one part by volume of water feed. The particles in the slurry can be the same as or different from the compound being precipitated; however, as it will be shown later, the system using solids of the same composition as the precipitatable compound is best. The solid particles are preferably fine in size in order to provide maximum surface area for nucleation of the precipitatable compound. The recycling or combining slurry from the system at system temperature is most convenient from the operational standpoint and in addition reduces the heat required to bring the slurry-feed water mixture to the final treating temperature. From the standpoint of control, the water slurry mixture is brought to a temperature at which the precipitatable compound is in a labile state under conditions favorable for spontaneous or shock nucleation or precipitation without scaling which would necessitate frequent shutdowns for equipment cleaning. Bringing the water-slurry mixture to a metastable state prior to spontaneous precipitation causes no difficulty because the solid particles serve as receptors for the deposition of compound and also the rate of precipitation is sufficiently slow to be controllable.

It is preferred that immediately after the water feed is brought to a metastable state of supersaturation with respect to the precipitatable compound, it is contacted with a hot gasiform material. Generally for this purpose the resultant slurry containing water feed is combined with gasiform material about 0.5 to 30 seconds after the slurry is combined with the water feed. Longer periods can be used with less satisfactory results, because with time, the compound precipitating on the solids keeps increasing their sizes and thus works against providing maximum surface area for shock or spontaneous nucleation.

The gasiform material which can be used in this invention can be a material which is a gas or a vapor, provided it does not influence adversely the result sought. Preferably such materials are inert towards the ingredients making up the slurry. The gasiform material includes nitrogen, argon, gaseous hydrocarbons, and steam. Steam is preferred for this purpose, because it is readily available. The quantity of gasiform material used will depend upon the heat required to raise the water-slurry mixture temperature to provide a labile state of supersaturation for the precipitatable compound. The economics will govern for the individual case, based on such factors as how much heat can be supplied from other sources more economically in raising the temperature to lower levels.

It is preferred that the steps of combining the water feed with slurry and thence raising the temperature of the resultant slurry be conducted as separate operations. While these steps can be effected in a single vessel of unitary structure, it was found that separate vessels produce unexpectedly better results. The operation with separate vessels provides better control, but, more important, is the fact that using a separate vessel for separation of water product by clarification results in significantly better separation. The product contains far less solid particles and the slurry bed, which serves as the clarifying means, is maintained far better than in the unitary design.

The gasiform material heats the slurry in a heating zone. The temperature is raised to a level at which the labile state is reached and the compound having inverse solubility is spontaneously precipitated. As a result, precipitation is predominant in forming new solid particles of fine size, although some growth of existing particles is also effected to a lesser, minor or small amount. Since large particles are not preferred in promoting spontaneous precipitation because of their low surface area to volume ratio and smoothness, it is preferred to arrange an upflow of slurry in the heating zone having a linear velocity which will selectively classify the large particles by permitting them to settle to the bottom region of the zone. The large particles are thence withdrawn at the desired rate, for instance, substantially at the rate at which the hardness is removed. The average linear velocity, based upon displacement of the slurry flowing upwardly in the heating zone is about 0.03 to 0.1 feet/second, and more usually about 0.05 to 0.075 feet/second. The residence time of the slurry in the zone is about 70 to 130 seconds. It was also discovered quite unexpectedly that if the concentration of growth particles is becoming high, as is evident from the increased concentration of dissolved compound in the water product, the rate of withdrawal of solid particles should be increased beyond the rate of precipitation of solid material in the system. Soon thereafter the system begins to operate with greater effectiveness in removal of precipitatable compound from the water feed and the rate of withdrawal of solid particles is returned to normal.

The slurry after spontaneous nucleation is subjected to a separation treatment for separation of solids as a relatively more concentrated slurry and a water fraction substantially free of solids and having the dissolved compound in a saturated state of solution. Various methods can be used for this purpose, such as filtration, centrifuging, etc. However, it is preferred using clarification by means of the slurry bed. The slurry of precipitated solids is maintained in the lower part of a vessel and the slurry from the heating zone passes upwardly through the same. The linear velocity of the upflowing slurry is about 0.001 to about 0.010 feet/second, more usually about 0.004 to about 0.006 feet/second. The residence time in the vessel is about 8 to about 25 minutes, more usually about 12 to about 19 minutes. As a result, a relatively more concentrated slurry is formed as a bottom phase or layer, whereas a clarified water product is the upper phase or layer.

The clarified liquid contains the hardness compound in solution at saturation condition at the treating temperature. However, to insure against operational upset which may cause the water product to become supersaturated, the water product is slightly cooled by the injection of a cooler water fraction no higher in concentration of the precipitatable compound than the product water. This is easily accomplished by cooling a portion of the product water and recombining it with the remaining product water.

The process of this invention has been applied to the treatment of the concentrated waters contained in evaporating equipment rendering such waters non-scaling to the heating surfaces of the evaporator. With this treatment, evaporating equipment may be operated at maximum capacity over periods of months without scaling of the evaporating surfaces and without loss of efficiency. Furthermore, with the use of the process of this invention, it is possible to operate evaporating equipment at higher concentrations without loss of efficiency, thus further reducing the cost of producing water of acceptable purity.

The process can also be applied to the treatment of concentrated waters containing either greater or lesser amounts of inversely soluble compounds or containing varying amounts of the several such compounds.

In the case of waters wherein the concentration of calcium and sulphate ions are sufficiently high to cause formation of calcium sulphate as one of the scale-forming compounds at the temperature of the evaporator system, it is desirable to perform the treatment of such water at a temperature of at least 270° F. This minimum temperature is preferred because at temperatures above about 265° F. the least soluble form of calcium sulphate (anhydrite) is precipitated, giving the maximum removal of calcium sulphate in the treating process.

At temperatures between 265° F. and 110° F. the most soluble form of calcium sulphate (hemihydrate) is formed predominantly. At temperatures below 110° F., calcium (gypsum) sulphate is formed. Gypsum is less soluble than hemihydrate.

In any event, the temperature at which the treatment by this process is performed must be at least 10 to 20° F. greater than the temperature existing in the evaporation system.

In the case of water wherein the concentration of calcium and sulphate ions are below that at which calcium sulphate is precipitated at the evaporator system temperature, the application of a minimum treatment temperature of 270° F. may not be required.

In the case of an evaporator system wherein magnesium hydroxide and/or calcium carbonate scales are the agent causing loss of efficiency of the unit, the process of this invention is used for precipitation and removal of the carbonate ions as calcium carbonate and the hydroxyl ions as magnesium hydroxide. The removal of objectionable quantities of these ions reduces the alkalinity and the pH of the water to the extent that the water becomes non-scaling at the temperature and pressure existing in the evaporator.

Hereafter in our detailed description of this process and apparatus we indicate an eductor to be used as the means of mixing the slurry and feed and as the means of motive force for transferring the slurry mixture to the subsequent heating zone. It should be understood that there are many satisfactory and commercially available mixing and pumping devices which may be used for this purpose and that this invention should not be limited to the use of an eductor for this purpose.

In this process the water-slurry mixture is heated to a temperature that will cause the water to be supersaturated beyond the metastable state of supersaturation, thus producing shock nucleation. This cannot be accomplished economically by indirect heat transfer methods using conventional type heat exchangers due to severe scaling of the heating surfaces. With this process, heating in this stage is accomplished by directly contacting a higher temperature gasiform material, such as steam, with the water-slurry mixture in a quantity sufficient to reach the required temperature. This heating stage is performed in a chamber containing a suitable mixing device for quickly mixing the gasiform material with the water-slurry mixture, thus obtaining almost instantaneous heating. By this means, a minimum time interval is permitted for particle growth before shock nucleation occurs, thus preventing appreciable scale formation or growth on the surfaces of the apparatus.

The shock nucleation reaction produces a maximum yield of finely divided particles which are uniformly distributed throughout the water, thus creating the optimum conditions for relief of supersaturation. By the efficient relief of supersaturation, the formation of scale in the heating chamber, solids separator and the transfer piping between these chambers is practically eliminated.

Prior to entering the direct contact heating zone of this process, the water has been maintained at a pressure greater than the vapor pressure of the water, thereby preventing boiling and thus retaining the dissolved gases in solution. Upon being heated by direct contact with a gasiform material of a higher temperature, such as steam, the water is raised to a temperature at which the vapor pressure of the water is equal to the pressure maintained in the heater. At such a temperature and pressure condition the water is at its boiling point, but is not boiled. In this process it is preferred to use a small excess of gasiform heating material which serves to strip out the dissolved gases. The removal of dissolved gases, such as carbon dioxide and oxygen, causes the water to become less corrosive. Also, the removal of the dissolved carbon dioxide causes the bicarbonate ions in the solution to decompose to a greater extent and to yield either or both carbonate and hydroxyl ions. Since the carbonate ions combine with calcium ions to form relatively insoluble calcium carbonate and the hydroxyl ions combine with magnesium to form relatively insoluble magnesium hydroxide, the precipitation of these scale-forming compounds is increased as a result of the stripping action.

The process of this invention has been employed successfully and economically with waters ranging widely in hardness and character, such as typical fresh water, a normal sea water and typical sea water evaporator brine. Analyses of these waters follows:

NORMAL SEA WATER

Ionic Analysis

| | |
|---|---|
| Sodium _____ p.p.m__ | 10,810 |
| Potassium _____ p.p.m__ | 390 |
| Calcium _____ p.p.m__ | 410 |
| Magnesium _____ p.p.m__ | 1,310 |
| Chlorine _____ p.p.m__ | 19,440 |
| Bromine _____ p.p.m__ | 66 |
| Bicarbonate _____ p.p.m__ | 143 |
| Sulphate _____ p.p.m__ | 2,710 |
| pH _____ | 8.1 |

Hypothetical Combinations

| | P.p.m. |
|---|---|
| Sodium chloride_____ | 27,492 |
| Sodium bromide_____ | 84 |
| Potassium chloride_____ | 745 |
| Magnesium chloride_____ | 3,293 |
| Magnesium sulphate_____ | 2,308 |
| Calcium bicarbonate_____ | 190 |
| Calcium sulphate_____ | 1,235 |

TYPICAL FRESH WATER

Ionic Analysis

| | |
|---|---|
| Sodium _____ p.p.m__ | 117 |
| Calcium _____ p.p.m__ | 44 |
| Magnesium _____ p.p.m__ | 12 |
| Chlorine _____ p.p.m__ | 187 |
| Bicarbonate _____ p.p.m__ | 246 |
| Sulphate _____ p.p.m__ | 29 |
| Silica _____ p.p.m__ | 14 |
| pH _____ | 7.75 |

Hypothetical Combinations

| | P.p.m. |
|---|---|
| Sodium chloride_____ | 308 |
| Sodium bicarbonate_____ | 71 |
| Sodium sulphate_____ | 43 |
| Calcium bicarbonate_____ | 178 |
| Magnesium bicarbonate_____ | 72 |
| Silica _____ | 14 |

TYPICAL SEA WATER EVAPORATOR BRINE

Ionic Analysis

| | |
|---|---|
| Sodium _____ p.p.m__ | 20,700 |
| Potassium _____ p.p.m__ | 774 |
| Calcium _____ p.p.m__ | 780 |
| Magnesium _____ p.p.m__ | 2,405 |
| Chlorine _____ p.p.m__ | 36,920 |
| Bromine _____ p.p.m__ | 131 |
| Bicarbonate _____ p.p.m__ | 66 |
| Carbonate _____ p.p.m__ | 26 |
| Sulphate _____ p.p.m__ | 5,370 |
| pH _____ | 8.55 |

Hypothetical Combinations

| | P.p.m. |
|---|---|
| Sodium chloride_____ | 52,540 |
| Sodium bromide_____ | 169 |
| Potassium chloride_____ | 1,475 |
| Magnesium chloride_____ | 5,820 |
| Magnesium sulphate_____ | 4,510 |
| Calcium bicarbonate_____ | 88 |
| Calcium carbonate_____ | 44 |
| Calcium sulphate_____ | 2,520 |

While this invention is especially suited for removal of precipitatable compounds, e.g., calcium sulphate from sea water, it is also effective in treating relatively fresh waters similar to that indicated in the analysis of a Typical Fresh Water listed above. It is particularly useful where the water supply may vary between these extremes since in cases where the water, due to tidal conditions or the like, may vary greatly over even short periods of time it is not necessary to materially alter the process.

In general, fresh waters such as those mentioned above, are relatively low in calcium and sulphate ions and as a result calcium sulphate is seldom formed except in concentrated water. However, such waters generally contain substantial quantities of bicarbonate ions and occasionally some carbonate ions, as well as calcium and/or magnesium ions. Therefore, upon heating, the unstable bicarbonate ions decompose to form carbonate ions and/or hydroxyl ions which may combine with the calcium or magnesium to form calcium carbonate and magnesium hydroxide, both of which are very slightly soluble and precipitate as a scale at very low concentrations. Occasionally complex compounds of the above ions are formed under some conditions. However, the factors influencing the formations of such precipitates or scales are not well known. By virtue of the design of the apparatus and the method of the process of this invention, such waters may also be heated and treated to yield a nonscaling product water at the desired temperature. Fresh waters of the type mentioned above may be processed with or without the addition of preheat and at the same conditions of temperature and pressure and at the same slurry recycle rate as mentioned above.

In order to provide a better understanding of this invention, reference will be had to the accompanying drawings which form a part of this specification, and wherein:

FIGURE 1 is a general correlation showing the solubility of calcium sulphate as related to temperature;

FIGURE 2 is a schematic flow diagram of a preferred operation of this invention;

FIGURE 3 illustrates the apparatus for use in precipitating compounds of inverse solubility;

FIGURE 4 illustrates an alternative apparatus for use in precipitating compounds of inverse solubility;

FIGURE 5 is a sectional view of the apparatus by which the product is cooled prior to being discharged from the system; and FIGURE 6 illustrates another application and mode of practicing this invention.

Referring to FIGURE 1 it is shown that a water containing X p.p.m. of calcium sulphate may be raised to a temperature A without precipitation. The condition of the water at this temperature is represented by point 1 on the solubility curve, at which the water is in a saturated condition. Increasing the temperature above A causes the water to become supersaturated and calcium sulphate precipitation will begin, thus reducing the concentration to a corresponding point on the solubility curve if sufficient time is available for the solution to reach equilibrium. Since the object of this invention is to produce a non-scaling heated water, and assuming the product water is to be used at temperature C, in practice the treatment would be effected at temperature B at which the water would contain Y p.p.m. of calcium sulphate in solution if sufficient time is allowed to reach equilibrium. After the system has reached equilibrium and the precipitated calcium sulphate is removed, the water is reduced to temperature C with Y p.p.m. of calcium sulphate in solution. Point 3 indicates the water to be under saturated at this condition and therefore will not undergo any precipitation.

In the terms of calcium sulphate concentration, X represents the concentration at the start of calcium sulphate precipitation. Z represents the calcium sulphate concentration that would be present if the precipitation only took place to point 4 on the curve. However, since the final temperature used in the process corresponds to point 2 on the curve, the resultant calcium sulphate concentration is Y. Therefore, Z minus Y represents the amount of undersaturation or the margin of safety in calcium sulphate concentration.

At relatively low degrees of supersaturation, precipitation to the extent that equilibrium solubility is reached is relatively slow, therefore, in the practice of this invention finely divided nuclei are added to the water before reaching a temperature appreciably greater than A, then the mixture is suddenly heated to temperature B. The condition of the water at temperature B is represented by point 5 at which the water is in a labile state of supersaturation which results in spontaneous nucleation causing precipitation to proceed to the extent that the water practically reaches equilibrium solubility. This practice is very advantageous as will be discussed hereafter.

Referring to FIGURE 2, sea water having the concentration, given above as Normal Sea Water, is applied by means of line 7 to pump 8 at the rate of about 171 barrels per day. The sea water is discharged from pump 8 to line 10 wherein the rate is measured and controlled by means of flow control meter 12. The sea water is discharged from line 10 into the top of a tower 13 by means of a distributor 15. In the upper section of tower 13 there is positioned a section of packing 16 of suitable material, such as Raschig rings or berl saddles, in order to effect uniform distribution and intimate contacting of flowing materials. Waste flue gases from the process, containing carbon dioxide, may be fed into the middle section of tower 13 by duct 18.

Another section of packing 20 is positioned below the point at which flue gas can be fed into tower 13 by means of duct 18. Thus, if desired, down-flowing sea water can be heated in two stages within tower 13, namely, in sections 16 and 20. For the purpose of control, the flue gas being fed into packing section 20 is generated by means of a flue gas generator 21. Flue gas generator 21 is positioned laterally with respect to tower 13 and it contains a suitable valved inlet 23 for air or oxygen containing gas and another suitable valved inlet 24 for fuel, such as, for example, gaseous hydrocarbon, etc. The relative proportions of air and fuel are controlled in order to provide a flue gas containing little or no excess oxygen. Passing sea water in counter-current relation to flue gas causes any absorbed oxygen in the water to be stripped out. This effect is maintained by careful control of the oxygen content of the flue gas by means of generator 21. Removal of absorbed oxygen reduces the corrosiveness of the water. In addition, flue gas generator 21 may be discontinued entirely in the event that sufficient waste heat is available from other sources for obtaining the desired preheat. As a result of contacting sea water with flue gas the pH is lowered to 6.75. The temperature of the sea water is raised to 180° F.

The heated sea water is withdrawn from the bottom of tower 13 by means of line 26 to pump 29. It is transported to indirect heat exchanger 27 by means of pump 29 in line 30. The rate of withdrawal is controlled by means of a liquid level control 32 positioned at the bottom of tower 13. Liquid level control 32 regulates a control valve 33, which is situated in line 30. Heat exchanger 27 is heated by means of steam which is supplied from line 35. Condensate is withdrawn from the exchanger by means of line 36. By reason of heating with steam, the sea water is raised in temperature to 300° F. The heated sea water is discharged from exchanger 27 by means of line 38 and it is fed to a second indirect heat exchanger 39. Exchanger 39 operates in the same way as exchanger 27. Steam is fed to the exchanger by means of line 40 and the condensate is withdrawn therefrom by means of line 42. The sea water is raised in temperature from 300° to 320° F. It should be understood that in case little scaling is encountered in the exchanger the outlet temperature may be increased, and in case of relatively severe scaling the outlet temperature may be lowered to maintain the scaling rate in the exchangers within an operable limit. It is necessary that the pressure on the water side of exchangers 27 and 39 be maintained sufficiently high to prevent boiling of the water within the tubes or escape of carbon dioxide, thus preventing scaling as a result of this action. The required pressure on the exchangers is attained by means of adequate control of the pressure in subsequent zones of the apparatus which will be discussed below. In this example a pressure of 120 p.s.i. is maintained in the exchangers. The higher the temperature attained in the exchangers, the less open steam is required for subsequently heating the water in a manner to be discussed hereinbelow. However, higher temperatures cause increased scaling within the exchanger and will necessitate more frequent cleaning of the exchanger.

The heated sea water flowing through line 43 is passed to an educator 44. The suction side of the educator is connected to a line 45 through which a hot aqueous slurry of precipitated solids flows. Line 45 is connected to the bottom of solids separator 47. By reason of the educator, the slurry is withdrawn from the bottom of solids separator 47 by means of line 45. This slurry is maintained at a temperature of 345° F. and it is combined with the sea water in the relative proportion of 1 part by volume of slurry to one part by volume of sea water. At this slurry to feed ratio the temperature of the mixture is 332° F. The slurry stream can be varied over a wide range but is preferably from about 0.2 to 2.0 parts by volume per part by volume of water. The presence of the precipitated solids, which are in a particulate state, serve as nuclei for seeding precipitation in the subsequent heating zone. In addition, the particles serve as an active surface for the precipitating solids, and in this way, the equipment is not coated with scale in this zone.

The slurry passes from eductor 44 to transfer line 48, which contains valve 49. One purpose of valve 49 is to momentarily block the flow to heater 51 in the event that line 45 becomes plugged with slurry material. Any plug or seal is broken by blowing back through line 45 with water supplied by line 43. In addition, valve 49 may also be used for controlling the water slurry ratio. The slurry has a linear velocity of about 0.77 feet/second in the transfer line 48, the residence time being about 3.5 seconds. The slurry flows from line 48 to a vertical conduit 54 which is partly positioned within the bottom of heater 51. A valved steam line 55 is disposed concentrically within conduit 54 and extends beyond the end thereof to the throat of a Venturi mixer 56. Steam is supplied in a quantity and at a temperature to raise the slurry temperature from 332° F. to 345° F. The Venturi mixer serves to mix the slurry with steam and to circulate the contents of the heater 51. The coarser particles settle to the bottom of heater 51, and are withdrawn therefrom by means of valved line 58.

In this operation it is preferred that coarse or growth particles do not exceed about 80–150 microns, these measurements being taken along perpendicular axes of the particle. In equilibrium state, it will be noted from microscopic examination of a sample of the slurry from line 58 which has been allowed to reach ambient temperature, that none of the particles exceed 80–150 microns. As soon as larger particles begin to appear in the withdrawn samples, it is evident that the unit is upset and that the rate of slurry withdrawal through line 58 should be increased. The rate of withdrawal can be continuous or intermittent, the guide being that the particle size is preferably not above 80–150 microns. Best results are obtained when the average particle size is about 1 to 10 microns. It will also be noted that through accretion or growth of the particle and attrition, one that has been in the system sufficiently long acquires a spherical shape. This may be taken as another indication that the rate of solids withdrawal should be increased to enhance production of new particles which are much better for spontaneous nucleation. In a reasonably smooth running operation, it will be noted that some particles are ellipsoidal in shape. In this operation the linear velocity of the slurry is about 0.05 feet per second and the residence time is about 120 seconds. The quantity of steam which is introduced to heater 51 is usually in excess of that required for heat maintenance. The excess steam serves to help in mixing and transporting the slurry upwardly through heater 51. For purpose of control, a slight excess of steam is used, as explained hereinafter.

The slurry and steam are passed overhead from heater 51 by means of line 60. The outlet end of line 60 is positioned within the down flow chamber 61 and extends to a point slightly below the liquid level. The down flow chamber 61 consists of a vertical cylindrical conduit having one end fastened to the top of the solids separator and the other end open and extending into the conical-shaped bottom of the solids separator. The down flow chamber contains several openings at the top thereof (not shown in FIGURE 2) which permits the pressure on the inside of the down flow chamber to equalize with the pressure in the space formed by chamber 61 and the shell of separator 47. The steam and fixed gases which separate from the slurry in chamber 61 pass through the equalizing openings, not shown, into the upper section of separator 47. The slurry flows downwardly through chamber 61 and enters the conical-shaped bottom 62 of the solids separator. As slurry settles, a relatively dense slurry bed is formed in the cone bottom 62 and in the lower section of the shell of separator 47. The relatively dense slurry is continuously withdrawn by the eductor 44 through line 45. The slurry has a linear velocity of about .004 feet/second, or a residence time of 19 minutes in the separator 47. The water separated from the slurry rises from the slurry bed to the upper section of separator 47 and is withdrawn by means of an outlet 63. The water product is withdrawn at a rate corresponding to the rate at which sea water is supplied by line 7, except for the small percentage of water included with the solids blow down from the system. Clarification of the product is improved by maintaining a dense slurry bed considerably above the lower end of the down flow chamber 61, thus causing the water to pass through the bed of dense slurry. By this means the finely divided particles in the water coalesce with solids of the slurry, thus aiding in the clarification of the water. In addition to aiding clarification, as mentioned above, the dense slurry bed reduces turbulence and improves settling of the slurry by reason of the increased density and viscosity of the slurry bed.

The valved sample connection 86 positioned in the lower section of the solids separator cone 62 is used frequently for obtaining sludge samples for examination. The valved sample connection 87 located in the lower section of the shell of solids separator 47 is frequently used to determine the depth of the sludge bed. Valved connection 53 is provided for draining the solids separator and connected apparatus. Valved line 52 is connected to line 45 and is used for the injection of small amounts of slurry (nuclei) into the system at the time that the apparatus is placed in operation. After the injection of this small amount of slurry, equivalent to about 5% of the normal slurry inventory of the system, precipitation proceeds very rapidly and no further injections are required.

The water product outlet 63 contains a concentric pipe 65 through which a small portion of the cooled product is injected into the product water, leaving the separator 47, as it enters outlet 63. The injection of this cooled product cools the product effluent to a temperature below saturation. This prevents further precipitation from occurring. In addition, for protection of outlet 63 from scaling due to upset conditions or due to poor mixing of the cooled injection water with the product, outlet 63 is equipped with a jacket through which water or other cooling means may be passed for cooling outlet pipe 63. This prevents scaling of outlet pipe 63. The cooled liquid product is withdrawn from line 63 by means of line 67 and it is fed to pump 69. The liquid product is discharged from pump 69 by means of line 70 and it is divided such that a portion is recycled through line 71 and the remaining part is yielded as product through line 72. The rate of withdrawal of liquid product through line 72 is controlled by means of a liquid level control 73, which is associated with the solids separator and a regulating valve 74 positioned in line 72. The liquid product which is recycled through line 71 first passes through a cooler 76 and then it is discharged therefrom by means of line 65.

Steam and other gases are discharged from the top of solids separator 47 by means of line 78. The discharged gases pass to a condenser 79 wherein substantially all of the steam is condensed. The condensed steam is discharged from the bottom of the condenser by means of line 81. Steam trap 80, which is located in line 81, controls the rate of condensate withdrawal. Gases and vapor not condensed in condenser 79 are withdrawn through line 82. A pressure control valve 83, situated in line 82, and activated by the pressure of separator 47, maintains a constant pressure on the system by regulation of the rate at which gases are vented from the system.

The description of the process and the conditions outlined above are suitable for production of a nonscaling product water at about 320° F. Nonscaling product waters at higher or lower temperatures may be produced by this process by adjustment of the operating conditions. For example, to produce a nonscaling product water at 365° F. the pressure on heater 51 and tank 57 would be maintained at about 195 p.s.i.g. and the heater and tank temperature would be maintained at about 385° F. The slurry to feed volume ratio may be maintained in the same range as discussed above.

FIGURE 3 is a schematic diagram involving the apparatus which is used for the precipitation of the inversely soluble compounds. The numerals shown in FIGURE 3 are the same as those used in FIGURE 2 for the same parts. The only difference is that the heater is to the right of the solids separator in FIGURE 3, whereas in FIGURE 2 it is to the left of the solids separator. This figure shows the opening 85 in the top of the down flow chamber 61 which serves to equalize the pressure between the inside of the down flow chamber and the solids separator.

In FIGURE 4, the preheated sea water flowing through line 43 from exchanger 39 (not shown) is passed through lines 120 for passage into the conically-shaped bottom 121 of the solids separator 122. Water entering from line 120 in the form of jets is directed toward the throat of a Venturi mixer 124. In so doing, the water passes through a narrow zone of dense slurry before entering the throat of the Venturi mixer, and as a result, admixes with a substantial volume of slurry before the total mass flows into the throat of the mixer. Steam is introduced by means of line 119. This steam line 119 extends to the throat of the Venturi mixer. The steam is supplied at a higher temperature than the water-slurry mixture, thereby furnishing heat to the system. In addition, steam serves as the motive force for drawing additional sludge or slurry into the Venturi mixer. The mixture of slurry and steam passes upwardly through pipe 125, and it is discharged slightly below the water level in down flow chamber 127. Accordingly, thorough mixing of water and slurry takes place simultaneously with heating by steam. By positioning pipe 125 within chamber 127 the turbulence resulting from the mixing is confined substantially to the inside of down flow chamber 127. Confining of turbulence in the mixing chamber 127 is desirable because less turbulence is, therefore, created in the solids separator 122.

The level of the slurry bed is maintained usually at the level of sample connection 130. By means of sample connection 130 it is possible to determine the level of the slurry bed relative to this point. Samples of slurry are withdrawn from the solids separator 122 by means of a valved connection 131 which is positioned in the bottom of conical section 121. The net production of crystals or solids which accumulate in the solids separator cone 121 is withdrawn continuously or periodically by means of line 132 and a valved blow down line 133. A valved line 134 is also connected to line 132 and it is used for introducing nuclei or slurry into the system for startup purposes.

Steam and other gases are discharged from the top of solids separator 122 by means of a line 136. As in the case of the apparatus shown in FIGURE 3, the upper end of down flow chamber 127 is connected to a flange 138. Flange 138 is fastened to the flanged portion 139 at the top of the solids separator 122. In order to equalize the pressure between the down flow chamber 127 and the solids separator 122, openings 140 are provided at the top of the down flow chamber 127. The cooling means for the product water outlet of the solids separator 122 is the same as that described for FIGURE 3.

The apparatus shown in FIGURE 4 is a unitary structure providing for separation of water product from crystalline material and for crystallization through shock nucleation. This apparatus has the advantage of being compact and of more economical construction for the purpose of this invention. However, it is noted that the apparatus shown in FIGURE 3 has the advantage of providing control of the rate of sludge or slurry coming into contact with preheated feed water. In addition, any turbulence created from contacting slurry with steam is confined to a heater which is separate from the solids separator; therefore, much better clarification is obtained.

In FIGURE 5 the outlet assembly contains outlet pipe 90. At one end of the outlet pipe 90 is connected a T 91. At right angles to pipe 90, outlet pipe 67 is connected to T 91. At the end of T 91, which is opposite to pipe 90, there is connected bushings 106 and 107, one within the other, and then hollow plug 108 is connected to bushing 107 forming a pressure tight gland. Cold water pipe 92 is positioned concentrically with hollow plug 108 and outlet pipe 90. The end of pipe 92, which is adjacent to separator 47, contains slotted openings 93 for passage of cold water into the out-flowing stream of water product. The cooling jacket is comprised of two annular zones formed by means of concentric pipes 95 and 94 with respect to pipe 90. Pipe 94 is of shorter length than pipe 95, and it contains one end attached to a T 97. At the opposite end of T 97, bushing 109 is connected thereto. Bushing 109 contains the other free end welded to pipe 95. Similarly, pipe 95 is connected to a T 100, whereas the opposite end of the T is connected to a bushing 110 which reduces to the diameter of pipe 90. Bushing 110 contains in threaded engagement therewith hollow plug 111, which contains pipe 90 passing therethrough.

The ends of pipes 90 and 94 are sealed or connected to each other by means of disc 96, adjacent to separator 47. At this point, pipe 95 is unattached, thus permitting cooling water to flow first between pipes 94 and 95 and then around the end of pipe 95 and into the zone between pipes 90 and 95. T 97 contains at right angle to pipe 95, an inlet pipe 99 threaded to a bushing 112 which in turn is fastened to T 97. Similarly, at right angles to pipe 95, T 100 contains an outlet pipe 107a fastened to bushing 114 which is threaded into T 95. The entire assembly is removable. Separator 47 contains pipe 102 connected thereto and it is of larger diameter than pipe 94. The other end of pipe 102 is connected to a flange 103. The companion flange 104 is welded to pipe 94. Therefore, to remove the cooling assembly, the flanges 103 and 104 are disconnected from each other and vice versa to place the assembly in position.

FIGURE 6 contains the embodiment of a typical vapor compression still for production of potable water from such waters as sea water. The feed water for this vapor compression still is sea water having the analysis as shown hereinbefore for Normal Sea Water. This FIGURE 6 and the following discussion will be used to illustrate the application of the process of this invention for the elimination of scale deposits in such apparatus as a vapor compression still.

In FIGURE 6, feed water having the above water composition is fed through line 145 to pump 146 and it is transported by means of pump 146, line 144, to an indirect heat exchanger 147 at the rate of 1150 pounds per hour and at a temperature of 78° F. The feed water is preheated to a temperature of 205° F. prior to passing to the bottom of an evaporator 149 by means of line 150. The level of liquid in the evaporator 149 is controlled by means of a level controller 150a which regulates a control valve 151 which in turn is positioned in line 150. As shown in the drawing, the feed water is fed into the shell side of the evaporator wherein it is heated to a temperature of 217° F. As a result, water is evaporated and withdrawn from the top of the evaporator by means of a line 154. The withdrawn steam is passed to vapor compressor 155 by which the pressure is increased from 0.50 p.s.i.g. to 4.5 p.s.i.g. The compressed steam vapor is delivered to the steam side of the evaporator heat exchanger 164 by means of line 156. Steam condensate which is produced from heating and evaporating the feed water through the heat exchange surface is withdrawn from the evaporator heat exchanger 164 by means of line 157 at the rate of 780 pounds per hour and at a temperature of about 225° F. From line 157 the condensate is passed to exchanger 147 where it heats indirectly the incoming water feed. Thereafter, the condensate is discharged from the exchanger by means of line 159. By the use of the apparatus (not shown) in conjunction with this type of evaporator the steam vapor produced in the evaporator 149 is slightly in excess of the capacity of vapor compressor 155, requiring the withdrawal of from 0 to 15 pounds of vapor per hour by means of line 161. The existence of a slight excess steam vapor in the evaporator permits the control of the evaporator pressure by regulation of the rate of withdrawal of this excess vapor. This control is accomplished by means of pressure control valve 162 situated in line 161 and actuated by the pressure existing in evaporator shell 149.

The regions of the evaporator above and below the bank of heat exchanger tubes designated as numeral 164 are interconnected by means of a down flow pipe 166. Concentrated heated water is withdrawn from the down flow pipe by means of a line 168 at a temperature of 217° F. A portion of the water being withdrawn by means of line 168 flows into a line 170, connected to pump 172, at the rate of 375 pounds per hour. This portion is the blow down from the process and it is discharged from the system by means of pump 172 and line 173. Line 173 is connected to exchanger 147. The temperature of the blow down is reduced in the exchanger by indirectly exchanging heat with the incoming feed and is discharged therefrom by means of line 175. The remaining portion of water which is withdrawn from the down flow pipe by means of line 168 passes through line 177 to pump 178 at the rate of 700 pounds per hour. It is next transported by means of pump 178 and line 179 to the sludge mixing zone of an apparatus as shown in FIGURE 2 wherein it is subjected to the treatment as described in connection with FIGURE 2 hereinabove. After crystallization treatment, the water is returned from the solids separator, not shown, to evaporator 149 by means of line 181 at the rate of 750 pounds per hour. The pressure in the solids separator is maintained above 30 p.s.i.g. by means as described in FIG. 2. The level as well as the rate of withdrawal of the water after crystallization treatment is controlled by means of valve 183 positioned in line 181 which is actuated by the level controller associated with the solids separator.

In the treatment, the preheated and concentrated water at a temperature of 217° F. and at a rate of 700 pounds per hour, is mixed with slurry at a rate of 925 pounds per hour and at a temperature of 275° F. The resultant slurry is at a temperature of 250° F. and flows to the heater at a rate of 1625 pounds per hour. Steam at the rate of 50 pounds per hour is mixed with the total slurry in the heater to produce a temperature of 275° F. within the heater which is held at a pressure slightly above 30 p.s.i.g. The mixture of slurry and steam is passed to the solids separator wherein clarified liquid is separated therefrom and returned to the evaporator at a temperature of 275° F.

In the above discussion we have described the application of this process to the treatment of concentrated sea water from a vapor compression evaporator operating at about normal commercial conditions of temperature and pressure. This process can be applied equally well to other types of evaporators and multiple effect evaporators operating at temperatures and pressures either higher or lower than the one indicated in the above discussion.

The use of the process of this invention with evaporators at conditions of temperature and pressure different from that described above may require the operating conditions of the crystallization treatment apparatus to be altered to accomplish the removal of the desired quantities of scale forming compounds from the water being recycled from the evaporator through this equipment. For example; in the case of an evaporator operating on sea water at a shell pressure of 30 p.s.i.g. and a water temperature of about 275° F. the preferred conditions of operation of the crystallization apparatus would be at a temperature of about 315° F. and a pressure of about 70 p.s.i.g.

Having thus provided a written description of the invention along with specific examples thereof, it should be understood that no undue restrictions or limitations are to be imposed by reason thereof but that the present invention is defined by the appended claims.

We claim:

1. The process of treating water to reduce the content of hardness precipitatable by increase in temperature comprising spontaneously nucleating such hardness in the water by carrying the temperature from a point below that of metastable supersaturation to a point of labile supersaturation in the presence of a slurry of finely divided solid particles comprising such hardness by introducing steam directly into said water whereby hardness is precipitated in part at least as new solid particles, and in part on the particles of said slurry, and separating said slurry and the resultant solid particles from said water and separating from said slurry and particles the larger particles to provide a slurry of the finer particles for further water-treatment.

2. The process of treating water to reduce the content of hardness precipitatable by increase in temperature comprising spontaneously nucleating such hardness in the water by carrying the temperature from a point below that of metastable supersaturation to a point of labile supersaturation in the presence of a slurry of finely divided solid particles comprising such hardness by introducing steam directly into said water whereby hardness is precipitated in part at least as new solid particles, and separating said slurry and the resultant solid particles from said water.

3. The process of treating water to reduce the content of hardness precipitatable by increase in temperature without substantial scale formation, comprising heating said water and increasing its acidity by introducing into direct heat exchange relationship therewith, hot flue gases containing carbon dioxide thereafter maintaining said water under superatmospheric pressure and increasing its temperature to that of metastable supersaturation, thereafter spontaneously nucleating such hardness in the water by carrying the temperature to a point of labile supersaturation in the presence of a slurry of finely divided solid particles comprising such hardness by introducing directly into said water heated gasiform material whereby hardness is precipitated in part at least as new solid particles and in part on the particles of said slurry and separating said slurry and the resultant solid particles from said water and separating from said slurry and particles, the larger particles to provide a slurry of the finer particles for further water-treatment.

4. The process of treating water to reduce the content of hardness precipitatable by increase in temperature comprising spontaneously nucleating such hardness in the water by carrying the temperature from a point below that of metastable supersaturation to a point of labile supersaturation in the presence of a slurry of finely divided solid particles comprising such hardness by introducing directly steam into said water whereby hardness is precipitated in part at least as new solid particles and in part on the particles of said slurry, and separating said slurry and the resultant solid particles from said water.

5. The process of treating water to reduce the content of hardness precipitatable by increase in temperature, comprising heating said water to a point of metastable supersaturation in part by admixing said water with a recirculated slurry of finely divided solid particles comprising such hardness carrying heat from the prior processing and spontaneously nucleating such hardness in the water by carrying the temperature to a point of labile supersaturation by introducing directly steam into said mixture of water and slurry whereby hardness is precipitated in part at least as new solid particles and in part on the particles of said slurry and separating said slurry and the resultant solid particles from said water and introducing said slurry while still heated into a new cycle of treatment.

6. The process of treating water to reduce the magnesium hydroxide calcium carbonate and calcium sulphate content without substantial scale formation, comprising introducing into said water a slurry of finely divided particles of at least one of said compounds and then spontaneously nucleating said compounds in the water by carrying the temperature to a point of labile supersaturation by introducing steam directly whereby said compounds are precipitated in part as new solid particles and in part on the particles of said slurry and separating said slurry and solid particles from said water.

7. The process of treating water to reduce the magnesium hydroxide calcium carbonate and calcium sulphate content, comprising heating said water to a point of metastable supersaturation and spontaneously nucleating said compounds from the water by carrying the temperature to a point of labile supersaturation in the presence of a slurry of finely divided solid particles of said compounds by introducing steam directly into said water in the presence of said slurry and then separating said slurry and said particles from said water.

8. A process which comprises combining water containing a compound having an inverse solubility characteristic with a hot aqueous slurry of finely divided solids of higher temperature and in a quantity sufficient to obtain a temperature not greater than the temperature at which the compound exists in a supersaturated state but below the point of spontaneous nucleation, combining the resultant mass with a hot gasiform material of higher temperature and thereby promoting the formation of new solid particles of the compound by spontaneous nucleation.

9. A process which comprises combining water containing a compound having an inverse solubility characteristic with an aqueous slurry of finely divided solids of the compound having an average particle size of not greater than about 10 microns, combining the resultant mass with a hot gasiform material of higher temperature and raising the temperature to a point of labile supersaturation thereby promoting the formation of new solid particles of the compound by spontaneous nucleation.

10. A process which comprises combining water containing a compound having an inverse solubility characteristic with a hot aqueous slurry of finely divided solids of the compound in a mixing zone, combining the water directly with a gasiform material of higher temperature and in a quantity sufficient to obtain a temperature at which the compound exists in a supersaturated state in a heating zone and thereby spontaneously precipitating new particles of the compound from the aqueous medium, passing the resultant slurry from the heating zone to a separation zone wherein a slurry of finely divided solids of the compound is separated from water substantially free of such solids and passing at least a portion of the separated slurry from the separation zone to the mixing zone.

11. A process which comprises combining water containing a compound having an inverse solubility characteristic with a hot aqueous slurry of finely divided solids of the compound in a mixing zone, combining the water directly with a gasiform material of higher temperature and in a quantity sufficient to obtain a temperature at which the compound exists in a supersaturated state in a heating zone, thereby forming new particles of the compound by spontaneous nucleation, and passing the resultant slurry from the heating zone to a clarification zone wherein a slurry of finely divided solids of the compound is maintained and the entering slurry passes upwardly therethrough for separation of water substantially free of said solids.

12. Apparatus for removing hardness from water including a pressure preheater for the water to be treated including a source of carbon dioxide, a heating vessel for admixing steam with a mixture of slurry and the water to be treated having a bottom inlet for steam and a bottom inlet for a mixture of slurry and the water to be treated and an upper outlet, a solid separation tank and a conduit communicating between the outlet of said vessel and said tank, said tank having a bottom outlet for slurry and an upper outlet for treated water, mixing means for admixing slurry to the water to be treated, a conduit communicating between the outlet of said tank and said mixing means, a conduit for the water to be treated communicating with said mixing means and a conduit leading from said mixing means to said heating vessel for conducting the mixture of water to be treated and slurry to said vessel, and means for withdrawing slurry from said apparatus.

13. Apparatus for removing hardness from water including a heating vessel for admixing steam with a mixture of slurry and the water to be treated having a bottom inlet for steam and a bottom inlet for a mixture of slurry and the water to be treated and an upper outlet, a solid separation tank and a conduit communicating between the outlet of said vessel and said tank, said tank having a bottom outlet for slurry and an upper outlet for treated water, mixing means for admixing slurry and the water to be treated, a conduit communicating between the outlet of said tank and said mixing means, a conduit for the water to be treated communicating with said mixing means and a conduit leading from said mixing means to said heating vessel for conducting the mixture of water to be treated and slurry to said heating vessel, and means for withdrawing slurry from said apparatus.

14. An apparatus comprising in combination an elongated solids separating means, an elongated gas separating means positioned within said solids separating means with the bottom end in open communication with the bottom section of said solids separating means, the upper end of said gas separating means being connected to the upper part of said solids separating means and provided with openings to permit the passage of gas therebetween, mixing means positioned below said solids separating means, a first transfer means interconnecting the bottom of said solids separating means with the mixing means, an elongated heating means positioned adjacent to said solids separating means, a second transfer means interconnecting the mixing means with the bottom section of said heating means, a third transfer means interconnecting the top of said heating means with said gas separating means, a gas inlet means for said heating means, means for discharging solids from said solids separating means and means for discharging liquid from said solids separating means.

15. An apparatus comprising in combination a vertical cylindrical solids separator, a vertical cylindrical section of reduced cross-sectional area positioned centrally within said solids separator having the upper end connected to the top thereof and the bottom end open to the bottom part thereof, said section containing means for exchange of gaseous material with said solids separator, an eductor positioned perpendicular to said solids separator, a first transfer means adapted for transfer of material from said solids separator to said eductor, an elongated vertical cylindrical heater being positioned parallel to said solids separator, a U-shape transfer means adapted for transfer of material from the top of said heater to the inside of said section, a second transfer means adapted for transfer of material from said eductor to the heater, a Venturi mixer positioned within said heater just above the point of entry of material from the second transfer means, and means for heating said heater.

16. The process of treating water, under pressure not less than the vapor pressure of the water at the treating temperature, to reduce the content of hardness precipitatable by increase in temperature comprising spontaneously nucleating such hardness in the water by carrying the temperature from a point below that of metastable supersaturation to a point of labile supersaturation in the presence of a slurry of finely divided solid particles comprising such hardness by introducing directly into said water heated gasiform material whereby hardness is precipitated in part at least as new solid particles and in part on the particles of said slurry and separating said slurry and the resultant solid particles from said water and separating from said slurry and particles, the larger particles to provide a slurry of the finer particles for further water-treatment.

References Cited in the file of this patent

UNITED STATES PATENTS

| | | |
|---|---|---|
| 743,352 | Trump | Nov. 3, 1903 |
| 953,960 | Koppers | Apr. 5, 1910 |
| 1,006,823 | Block | Oct. 24, 1911 |
| 1,060,901 | Hodges | May 6, 1913 |
| 1,399,845 | Bull | Dec. 13, 1921 |
| 1,609,853 | Badger | Dec. 7, 1926 |
| 1,653,272 | Green et al. | Dec. 20, 1927 |
| 1,831,121 | Kermer | Nov. 10, 1931 |
| 1,927,555 | Oetken | Sept. 19, 1933 |
| 2,140,992 | Gensecke | Dec. 20, 1938 |
| 2,561,395 | Marshall | July 24, 1951 |
| 2,604,444 | Piccardo | July 22, 1952 |
| 2,631,926 | Eckstrom | Mar. 17, 1953 |
| 2,647,370 | Miller | Aug. 4, 1953 |
| 2,663,683 | McAndrews | Dec. 22, 1953 |
| 2,698,225 | Svanoe | Dec. 28, 1954 |
| 2,709,675 | Phinney | May 31, 1955 |
| 2,754,897 | Ramen | July 17, 1956 |
| 2,756,029 | Brogden | July 24, 1956 |
| 2,856,074 | Dubitzky | Oct. 14, 1958 |

FOREIGN PATENTS

| | | |
|---|---|---|
| 5,339 (of 1889) | Great Britain | Mar. 22, 1890 |
| 485,667 | Canada | Aug. 12, 1952 |
| 534,576 | Canada | Dec. 18, 1956 |

OTHER REFERENCES

Parson et al.: "Sludge Return for Control of Scale Formation," "Industrial and Engineering Chemistry," July 1954, pages 1503–1507, volume 46, No. 7.

UNITED STATES PATENT OFFICE

CERTIFICATE OF CORRECTION

Patent No. 3,026,261                          March 20, 1962

Alfred L. Mayfield et al.

It is hereby certified that error appears in the above numbered patent requiring correction and that the said Letters Patent should read as corrected below.

Column 4, line 13, for "maitnained" read -- maintained --; line 39, for "clacium" read -- calcium --; column 11, line 16, for "educator", each occurrence, read -- eductor --; column 14, line 66, for "angles" read -- angle --; column 17, lines 22 and 34, for "directly steam", each occurrence, read -- steam directly --.

Signed and sealed this 4th day of September 1962.

(SEAL)
Attest:

ERNEST W. SWIDER                          DAVID L. LADD

Attesting Officer                            Commissioner of Patents